US011639188B2

(12) United States Patent
Kernwein et al.

(10) Patent No.: US 11,639,188 B2
(45) Date of Patent: May 2, 2023

(54) WORK ZONE INSTRUCTION VERIFICATION SYSTEM

(71) Applicant: Westinghouse Air Brake Technologies Corporation, Wilmerding, PA (US)

(72) Inventors: Jeffrey D. Kernwein, Cedar Rapids, IA (US); Karen A. Shaw, Cedar Rapids, IA (US); Thomas Paul Spiegelhalter, Jr., Cedar Rapids, IA (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 342 days.

(21) Appl. No.: 16/841,296

(22) Filed: Apr. 6, 2020

(65) Prior Publication Data

US 2020/0233423 A1 Jul. 23, 2020

Related U.S. Application Data

(63) Continuation-in-part of application No. 15/726,446, filed on Oct. 6, 2017, now abandoned.
(Continued)

(51) Int. Cl.
*B61L 23/06* (2006.01)
*G05D 1/02* (2020.01)
(Continued)

(52) U.S. Cl.
CPC .......... *B61L 23/06* (2013.01); *B61L 15/0027* (2013.01); *B61L 15/0072* (2013.01); *B61L 27/20* (2022.01);
(Continued)

(58) Field of Classification Search
CPC .. B61L 23/06; B61L 15/0027; B61L 15/0072; B61L 27/20; B61L 27/40; G05D 1/0022; G05D 1/0044; G05D 1/0214
See application file for complete search history.

(56) References Cited

U.S. PATENT DOCUMENTS 6,064,318 A    5/2000  Kirchner, III et al.
6,371,416 B1 *  4/2002  Hawthorne ........... B61L 25/026
                                                    246/4
(Continued)

FOREIGN PATENT DOCUMENTS

EP       2937260 A1    10/2015
WO    2013079908 A1     6/2013
WO    2016054500 A1     4/2016

OTHER PUBLICATIONS

Examination Report dated Oct. 19, 2021 for corresponding Australian No. AU2017342917. (6 pages).
(Continued)

*Primary Examiner* — Zachary L Kuhfuss
(74) *Attorney, Agent, or Firm* — The Small Patent Law Group LLC; Christopher R. Carroll

(57) ABSTRACT

Provided is a computer-implemented method for verifying electronic work zone instructions with an on-board system of a vehicle system. The method includes receiving at least one electronic work zone instruction message from an employee-in-charge device, generating at least one visual instruction diagram based at least partially on the electronic work zone instruction message, communicating the at least one visual instruction diagram from the on-board system of the vehicle system to the employee-in-charge device, receiving a verification of the at least one visual instruction diagram from the employee-in-charge device, and enforcing at least one work zone instruction parameter of the electronic work zone instruction message by the on-board system of the vehicle system in response to receiving the verification. A system and computer program product are also provided.

10 Claims, 6 Drawing Sheets

Related U.S. Application Data

(60) Provisional application No. 62/406,144, filed on Oct. 10, 2016.

(51) Int. Cl.
    *G05D 1/00*     (2006.01)
    *B61L 15/00*     (2006.01)
    *B61L 27/20*     (2022.01)
    *B61L 27/40*     (2022.01)

(52) U.S. Cl.
    CPC ............ *B61L 27/40* (2022.01); *G05D 1/0022* (2013.01); *G05D 1/0044* (2013.01); *G05D 1/0214* (2013.01)

(56) References Cited

U.S. PATENT DOCUMENTS

| | | | | |
|---|---|---|---|---|
| 6,799,097 | B2* | 9/2004 | Villarreal Antelo | B61L 27/14 701/19 |
| 7,624,952 | B1* | 12/2009 | Bartek | B61L 23/06 246/477 |
| 8,344,877 | B2* | 1/2013 | Sheardown | B61L 23/06 246/477 |
| 8,952,805 | B2* | 2/2015 | Baines | G08B 27/001 340/539.12 |
| 10,106,079 | B2* | 10/2018 | Denny | B61L 29/24 |
| 10,207,726 | B2* | 2/2019 | Bartek | G08B 6/00 |
| 10,421,473 | B2* | 9/2019 | Shaw | B61L 15/0018 |
| 2003/0236598 | A1 | 12/2003 | Villarreal Antelo et al. | |
| 2011/0278401 | A1 | 11/2011 | Sheardown et al. | |
| 2014/0104081 | A1 | 4/2014 | Cross et al. | |
| 2015/0108284 | A1 | 4/2015 | Pirtle | |
| 2015/0291193 | A1 | 10/2015 | Perras et al. | |
| 2016/0096538 | A1* | 4/2016 | Bartek | B61L 23/06 246/28 R |
| 2016/0096539 | A1* | 4/2016 | Bartek | B61L 25/026 246/123 |
| 2016/0280240 | A1* | 9/2016 | Carlson | G01S 19/17 |
| 2017/0282944 | A1* | 10/2017 | Carlson | G01S 19/17 |
| 2018/0086357 | A1* | 3/2018 | Shaw | B61L 27/20 |
| 2018/0099684 | A1* | 4/2018 | Kernwein | B61L 15/009 |
| 2018/0244292 | A1* | 8/2018 | Bailey | B61L 25/025 |

OTHER PUBLICATIONS

Preliminary Office Action for Brazilian Patent Application BR 11 2019 007264-0. English translation provided.

\* cited by examiner

WORK ZONE INSTRUCTION VERIFICATION SYSTEM

CROSS REFERENCE TO RELATED APPLICATIONS

This application is a continuation-in-part of U.S. patent application Ser. No. 15/726,446, filed 6 Oct. 2017, which claims the benefit of U.S. Provisional Application No. 62/406,144, filed 10 Oct. 2016. The entire disclosures of these applications are incorporated herein by reference.

BACKGROUND

Technical Field

The inventive subject matter described herein relates to electronic work zone instructions and systems and methods for verifying the work zone instructions.

Discussion of Art

Work zone bulletins provide a method to inform rail vehicle systems of operating rules or limitations for an area of track where personnel and/or equipment may be working on the track (e.g., a "work zone"). This includes information such as where the limits of the work zone are, what speed to proceed through the work zone (once permission is obtained to enter the work zone), and other like information. According to the General Code of Rules (GCOR) and other applicable operating policies, only the employee-in-charge (EIC) is permitted to give permissions and instructions to the vehicle system entering a work zone. Existing systems involve the EIC communicating with a vehicle system using voice communication communicated over a radio frequency.

Some railroads are looking for methods to move efficiently and safely and are moving away from relying on crews to accurately use voice communication in conjunction with a Positive Train Control (PTC) solution. Currently, a rail vehicle system can approach a work zone and radio the EIC of the work zone for permission to enter and for any instructions as to speed and stops within the work zone controlled by that EIC. The operator of the vehicle system presses a button on the cab display unit (CDU) within the vehicle system and allows that vehicle system to enter, with no ability to electronically verify that the vehicle system actually had permission to enter the work zone.

BRIEF SUMMARY

In one embodiment, a method is provided that includes receiving at least one electronic work zone instruction message from an employee-in-charge device, generating at least one visual instruction diagram based at least partially on the electronic work zone instruction message, communicating the at least one visual instruction diagram from an on-board system of a vehicle system to the employee-in-charge device, receiving, by the on-board system of the vehicle system, a verification of the at least one visual instruction diagram from the employee-in-charge device, and, in response to receiving the verification, enforcing at least one work zone instruction parameter of the electronic work zone instruction message by the on-board system of the vehicle system.

In one embodiment, another method is provided that includes receiving (by an on-board system of a vehicle system) at least one electronic work zone instruction message from an employee-in-charge device, generating (by the on-board system of the vehicle system) at least one visual instruction diagram based at least partially on the electronic work zone instruction message, communicating the at least one visual instruction diagram from the on-board system of the vehicle system to the employee-in-charge device, receiving (by the on-board system of the vehicle system) a verification of the at least one visual instruction diagram or at least one new electronic work zone instruction message from the employee-in-charge device, and, in response to receiving the verification or the at least one new electronic work zone instruction message: (i) enforcing at least one work zone instruction parameter of the electronic work zone instruction message by the on-board system of the vehicle system responsive to the verification being received; or (ii) generating, by the on-board system of the vehicle system, at least one new visual instruction diagram based at least partially on the at least one new electronic work zone instruction message responsive to a rejection being received.

In one embodiment, a verification system includes an on-board control system configured to be disposed onboard a vehicle system. The on-board control system includes one or more processors configured to receive at least one electronic work zone instruction message from an employee-in-charge device, generate a visual instruction diagram based at least partially on the electronic work zone instruction message, communicate the visual instruction diagram to the employee-in-charge device, receive a verification or a rejection of the visual instruction diagram from the employee-in-charge device, and, in response to receiving a verification, enforce the electronic work zone instruction message by the on-board system of the vehicle system.

BRIEF DESCRIPTION OF THE DRAWINGS

Additional advantages and details of the inventive subject matter are explained in greater detail below with reference to the example embodiments that are illustrated in the accompanying schematic figures, in which.

DETAILED DESCRIPTION

Figure 1:
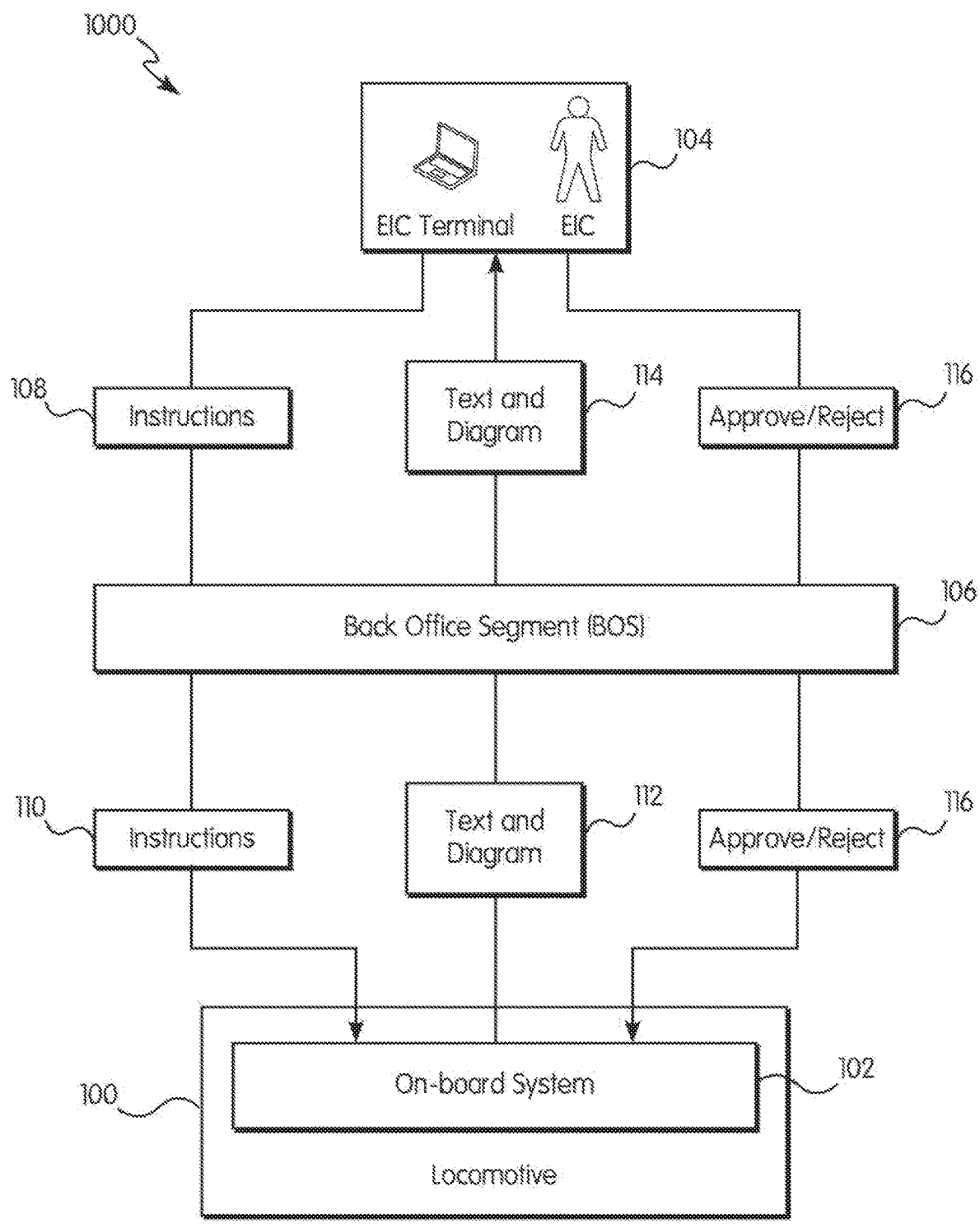
FIG. 1 is a schematic diagram of one example of a verification system for verifying work zone instructions.

For purposes of the description hereinafter, the terms "end," "upper," "lower," "right," "left," "vertical," "horizontal," "top," "bottom," "lateral," "longitudinal," and derivatives thereof shall relate to the inventive subject matter as it is oriented in the drawing figures. However, it is to be understood that the inventive subject matter may assume various alternative variations and step sequences, except where expressly specified to the contrary. It is also to be understood that the specific devices and processes illustrated in the attached drawings, and described in the following specification, are simply example embodiments or aspects of the inventive subject matter. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit or component to be in communication with another unit or component means that the one unit or component is able to directly or indirectly receive data from and/or send data to the other unit or component. This can refer to a direct or indirect connection that may be wired and/or wireless in nature. Additionally, two units or components may be in communication with each other even though the data communicated may be modified, processed, and/or routed between the first and second unit or component. For example, a first unit may be in communication with a second unit even though the first unit passively receives data and does not actively send data to the second unit. As another example, a first unit may be in communication with a second unit if an intermediary unit processes data from one unit and communicates processed data to the second unit. It will be appreciated that numerous other arrangements are possible.

According to an example of the inventive subject matter, provided is a computer-implemented method for verifying electronic work zone instructions with an on-board system of a vehicle system. The vehicle system can be a rail vehicle system (e.g., a train formed from one or more locomotives and optionally one or more other rail vehicles), or can be a multi-vehicle system formed from non-rail vehicles. The vehicles in the vehicle system may be automobiles, tractors, trucks, marine vessels, mining vehicles, agricultural vehicles, or the like. The vehicles of the vehicle system may be mechanically coupled with each other. Optionally, the vehicles may not be mechanically coupled with each other, but may be logically coupled such that the vehicles communicate with each other to coordinate their movements with each other so as to move as a convoy (e.g., the vehicle system) along routes. The method can include receiving, by the on-board system of the vehicle system, at least one electronic work zone instruction message from an employee-in-charge device; generating, by the on-board system of the vehicle system, at least one visual instruction diagram based at least partially on the electronic work zone instruction message; communicating the at least one visual instruction diagram from the on-board system of the vehicle system to the employee-in-charge device; receiving, by the on-board system of the vehicle system, a verification of the at least one visual instruction diagram from the employee-in-charge device; and in response to receiving the verification, enforcing at least one work zone instruction parameter of the electronic work zone instruction message by the on-board system of the vehicle system.

In non-limiting embodiments, the at least one visual instruction diagram comprises at least one track diagram and textual instructions. Moreover, generating the at least one visual instruction diagram may comprise: extracting, by the on-board system, a plurality of work zone instruction parameters from the electronic work zone instruction message; and converting, by the on-board system of the vehicle system, the plurality of work zone instruction parameters to the visual instruction diagram.

In non-limiting embodiments, the at least one electronic work zone instruction is received from a back office system, and the back office system receives the at least one electronic work zone instruction message from the employee-in-charge device. Moreover, the back office system may, after receiving the at least one electronic work zone instruction message, extract a plurality of work zone instruction parameters from the electronic work zone instruction message and transform the plurality of work zone instruction parameters to a track data framework associated with the on-board system of the vehicle system.

In non-limiting embodiments, the at least one electronic work zone instruction message may comprise at least one of the following work zone instruction parameters: work zone limits, a work zone speed restriction, a work zone route, or any combination thereof. Moreover, communicating the at least one visual instruction diagram from the on-board system of the vehicle system to the employee-in-charge device may comprise communicating the at least one visual instruction diagram from the on-board system to a back office system, and communicating the at least one visual instruction diagram from the back office system to the employee-in-charge device. In some examples, the employee-n-charge device may comprise a handheld or portable computer. Moreover, the method may further comprise requesting, by the on-board system of the vehicle system, the at least one electronic work zone instruction message from the employee-in-charge device, wherein the at least one electronic work zone instruction message is communicated by the employee-in-charge device in response to the request.

According to another example of the inventive subject matter, provided is a computer-implemented method for verifying electronic work zone instructions with an on-board system of a vehicle system, comprising: receiving, by the on-board system of the vehicle system, at least one electronic work zone instruction message from an employee-in-charge device; generating, by the on-board system of the vehicle system, at least one visual instruction diagram based at least partially on the electronic work zone instruction message; communicating the at least one visual instruction diagram from the on-board system of the vehicle system to the employee-in-charge device; receiving, by the on-board system of the vehicle system, a verification of the at least one visual instruction diagram or at least one new electronic work zone instruction message from the employee-in-charge device; and in response to receiving the verification or the at least one new electronic work zone instruction message: (i) enforcing at least one work zone instruction parameter of the electronic work zone instruction message by the on-board system of the vehicle system if the verification is received; or (ii) generating, by the on-board system of the vehicle system, at least one new visual instruction diagram based at least partially on the at least one new electronic work zone instruction message if the rejection is received.

In non-limiting embodiments, the method further comprises: (a) communicating the new visual instruction diagram from the on-board system of the vehicle system to the employee-in-charge device; (b) receiving, by the on-board system of the vehicle system, a verification of the new visual instruction diagram or at least one new electronic work zone instruction message from the employee-in-charge device; and (c) in response to receiving the verification or the at least one further electronic work zone instruction message: (i) enforcing the at least one new electronic work zone instruction message by the on-board system of the vehicle system if the verification is received; or (ii) generating, by the on-board system of the vehicle system, a new visual instruction diagram based at least partially on the at least one new electronic work zone instruction message. In some examples, the method may further comprise repeating steps (a)-(c) until at least one electronic work zone instruction message is enforced by the on-board system of the vehicle system.

According to a further non-limiting embodiment of the inventive subject matter, provided is a system for verifying electronic work zone instructions with an on-board system of a vehicle system, comprising: (a) an on-board control system arranged on at least one propulsion-generating vehicle (e.g., a locomotive, automobile, marine vessel, mining vehicle, agricultural vehicles, etc.) of a vehicle system, the on-board control system comprising one or more processors programmed or configured to: (i) receive at least one electronic work zone instruction message from an employee-in-charge device; (ii) generate a visual instruction diagram based at least partially on the electronic work zone instruction message; (iii) communicate the visual instruction diagram to the employee-in-charge device; (iv) receive, by the on-board system of the vehicle system, a verification or a rejection of the visual instruction diagram from the employee-in-charge device; and (v) in response to receiving a verification, enforce the electronic work zone instruction message by the on-board system of the vehicle system.

The system may further comprise the employee-in-charge device comprising at least one portable computing device including at least one processor programmed or configured to: (i) receive user input; (ii) generate the work zone instruction message based on the user input; (iii) receive the visual instruction diagram from the on-board control system; (iv) display the visual instruction diagram; and (v) receive the approval or the rejection from the user.

The at least one visual instruction diagram may comprise at least one track diagram and textual instructions. Further, the on-board control system may be programmed or configured to: extract a plurality of work zone instruction parameters from the electronic work zone instruction message; and generate the at least one visual instruction diagram by converting the plurality of work zone instruction parameters to the at least one visual instruction diagram.

The at least one electronic work zone instruction is received from a back office system, and the back office system receives the at least one electronic work zone instruction message from the employee-in-charge device. In some examples, the back office system, after receiving the at least one electronic work zone instruction message, extracts a plurality of work zone instruction parameters from the electronic work zone instruction message and transforms the plurality of work zone instruction parameters to a track data framework associated with the on-board system of the vehicle system.

The at least one electronic work zone instruction message may comprise at least one of the following work zone instruction parameters: work zone limits, a work zone speed restriction, a work zone route, or any combination thereof. Moreover, the on-board control system may communicate the at least one visual instruction diagram from the on-board system of the vehicle system to the employee-in-charge device by communicating the at least one visual instruction diagram from the on-board system to a back office system, and communicating the at least one visual instruction diagram from the back office system to the employee-in-charge device. In some examples, the employee-in-charge device may comprise a handheld or portable computer. Moreover, the on-board computer may be programmed or configured to request the at least one electronic work zone instruction message from the employee-in-charge device, and the at least one electronic work zone instruction message may be communicated by the employee-in-charge device in response to the request.

A computer program product for verifying electronic work zone instructions with an on-board system of a vehicle system also is provided. This program product includes at least one non-transitory computer-readable medium including program instructions that, when executed by the on-board system of the vehicle system, cause the on-board system to: receive at least one electronic work zone instruction message from an employee-in-charge device; generate at least one visual instruction diagram based at least partially on the electronic work zone instruction message; communicate the at least one visual instruction diagram to the employee-in-charge device; receive a verification of the at least one visual instruction diagram from the employee-in-charge device; and in response to receiving the verification, enforce at least one work zone instruction parameter of the electronic work zone instruction message by the on-board system of the vehicle system.

As another example, a computer-implemented method for verifying electronic work zone instructions with an on-board system of a vehicle system is provided. The method includes receiving, by the on-board system of the vehicle system, at least one electronic work zone instruction message from an employee-in-charge device; generating, by the on-board system of the vehicle system, at least one visual instruction diagram based at least partially on the electronic work zone instruction message; communicating the at least one visual instruction diagram from the on-board system of the vehicle system to the employee-in-charge device; receiving, by the on-board system of the vehicle system, a verification of the at least one visual instruction diagram from the employee-in-charge device; and in response to receiving the verification, enforcing at least one work zone instruction parameter of the electronic work zone instruction message by the on-board system of the vehicle system.

The at least one visual instruction diagram can comprise at least one track diagram and textual instructions.

The at least one visual instruction diagram can be generated by extracting, by the on-board system, a plurality of work zone instruction parameters from the electronic work zone instruction message; and converting, by the on-board system of the vehicle system, the plurality of work zone instruction parameters to the visual instruction diagram.

The at least one electronic work zone instruction can be received from a back office system, and wherein the back office system receives the at least one electronic work zone instruction message from the employee-in-charge device.

The back office system, after receiving the at least one electronic work zone instruction message, can extract a plurality of work zone instruction parameters from the electronic work zone instruction message and transforms the plurality of work zone instruction parameters to a track data framework associated with the on-board system of the vehicle system.

The at least one electronic work zone instruction message can comprise at least one of the following work zone instruction parameters: a work zone limit, a work zone speed restriction, a work zone route, or any combination thereof.

Communicating the at least one visual instruction diagram from the on-board system of the vehicle system to the employee-in-charge device can comprise communicating the at least one visual instruction diagram from the on-board system to a back office system, and communicating the at least one visual instruction diagram from the back office system to the employee-in-charge device.

The employee-in-charge device can include a handheld or portable computer.

The method also can include requesting, by the on-board system of the vehicle system, the at least one electronic work zone instruction message from the employee-in-charge device, wherein the at least one electronic work zone instruction message is communicated by the employee-in-charge device in response to the request.

As another example, a computer-implemented method for verifying electronic work zone instructions with an on-board system of a vehicle system is provided. The method includes receiving, by the on-board system of the vehicle system, at least one electronic work zone instruction message from an employee-in-charge device; generating, by the on-board system of the vehicle system, at least one visual instruction diagram based at least partially on the electronic work zone instruction message; communicating the at least one visual instruction diagram from the on-board system of the vehicle system to the employee-in-charge device; receiving, by the on-board system of the vehicle system, a verification of the at least one visual instruction diagram or at least one new electronic work zone instruction message from the employee-in-charge device; and in response to receiving the verification or the at least one new electronic work zone instruction message: (i) enforcing at least one work zone instruction parameter of the electronic work zone instruction message by the on-board system of the vehicle system if the verification is received; or (ii) generating, by the on-board system of the vehicle system, at least one new visual instruction diagram based at least partially on the at least one new electronic work zone instruction message if the rejection is received.

The at least one new electronic work zone instruction message can be received, and the also can include (a) communicating the new visual instruction diagram from the on-board system of the vehicle system to the employee-in-charge device; (b) receiving, by the on-board system of the vehicle system, a verification of the new visual instruction diagram or at least one new electronic work zone instruction message from the employee-in-charge device; and (c) in response to receiving the verification or the at least one further electronic work zone instruction message: (i) enforcing the at least one new electronic work zone instruction message by the on-board system of the vehicle system if the verification is received; or (ii) generating, by the on-board system of the vehicle system, a new visual instruction diagram based at least partially on the at least one new electronic work zone instruction message.

The operations (a)-(c) can be repeated until at least one electronic work zone instruction message is enforced by the on-board system of the vehicle system.

In another example, a verification system for verifying electronic work zone instructions with an on-board system of a vehicle system is provided. The verification system includes (a) an on-board control system arranged on at least one locomotive of a vehicle system, the on-board control system comprising at least one processor programmed or configured to: (i) receive at least one electronic work zone instruction message from an employee-in-charge device; (ii) generate a visual instruction diagram based at least partially on the electronic work zone instruction message; (iii) communicate the visual instruction diagram to the employee-in-charge device; (iv) receive, by the on-board system of the vehicle system, a verification or a rejection of the visual instruction diagram from the employee-in-charge device; and (v) in response to receiving a verification, enforce the electronic work zone instruction message by the on-board system of the vehicle system.

The system also can include (b) the employee-in-charge device comprising at least one portable computing device including at least one processor programmed or configured to: (i) receive user input; (ii) generate the work zone instruction message based on the user input; (iii) receive the visual instruction diagram from the on-board control system; (iv) display the visual instruction diagram; and (v) receive the approval or the rejection.

The at least one visual instruction diagram can include at least one track diagram and textual instructions.

The on-board control system can be further programmed or configured to: extract a plurality of work zone instruction parameters from the electronic work zone instruction message; and generate the at least one visual instruction diagram by converting the plurality of work zone instruction parameters to the at least one visual instruction diagram.

The at least one electronic work zone instruction can be received from a back office system, and the back office system can receive the at least one electronic work zone instruction message from the employee-in-charge device.

The back office system, after receiving the at least one electronic work zone instruction message, can extract a plurality of work zone instruction parameters from the electronic work zone instruction message and transforms the plurality of work zone instruction parameters to a track data framework associated with the on-board system of the vehicle system.

The at least one electronic work zone instruction message can include at least one of the following work zone instruction parameters: a work zone limit, a work zone speed restriction, a work zone route, or any combination thereof.

The at least one visual instruction diagram can be communicated from the on-board system of the vehicle system to the employee-in-charge device by communicating the at least one visual instruction diagram from the on-board system to a back office system, and communicating the at least one visual instruction diagram from the back office system to the employee-in-charge device.

The employee-in-charge device can include a handheld or portable computer.

The on-board control system can be further programmed or configured to request the at least one electronic work zone instruction message from the employee-in-charge device, wherein the at least one electronic work zone instruction message is communicated by the employee-in-charge device in response to the request.

A computer program product for verifying electronic work zone instructions with an on-board system of a vehicle system can include at least one non-transitory computer-readable medium including program instructions that, when executed by the on-board system of the vehicle system, cause the on-board system to: receive at least one electronic work zone instruction message from an employee-in-charge device; generate at least one visual instruction diagram based at least partially on the electronic work zone instruction message; communicate the at least one visual instruction diagram to the employee-in-charge device; receive a verification of the at least one visual instruction diagram from the employee-in-charge device; and in response to receiving the verification, enforce at least one work zone instruction parameter of the electronic work zone instruction message by the on-board system of the vehicle system.

According to another example, a system for verifying railroad work zone instructions is provided. The system can provide for a closed-loop verification process to allow for an employee-in-charge (EIC) controlling a work zone to verify that the locomotive and/or vehicle system crew received the correct work zone instructions. The EIC may be one or more individuals responsible for vehicle system admission and movement in a designated work zone where maintenance is being performed on track segments, signaling systems, switches, and/or other like railroad components. The EIC, through an EIC device, communicates one or more work zone instruction messages to the on-board system of a locomotive, either directly or indirectly through a back office segment (e.g., back office system) (BOS). The on-board system receives the work zone instruction message(s), analyzes the data stored therein, and generates a visual diagram and/or textual instructions based on the work zone instruction message(s). The on-board system then communicates the visual diagram and/or textual instructions back to the EIC device, either directly or indirectly through a BOS. The EIC is then enabled to, through the EIC device, approve or reject the visual diagram and/or textual instructions. If the visual diagram and/or textual instructions are approved, indicating a match with the intended instructions, an approval signal is communicated to the on-board system and the work zone instructions are enforced. If the visual diagram and/or textual instructions are rejected by the EIC, one or more new work zone instruction messages are communicated to the on-board system of the vehicle system and the process is repeated until instructions are ultimately enforced.

FIG. 1 is a schematic diagram of a system 1000 for verifying railroad work zone instructions according to a preferred and non-limiting embodiment. The system 1000 includes a propulsion-generating vehicle 100 of a vehicle system that includes an on-board control system 102. The on-board control system 102 may be, for example, a vehicle system management computer, a processor, or any other like computing device for controlling one or more aspects of the locomotive and communicating with internal and/or external components of the vehicle system. The system also includes an EIC device 104, which may be, for example, a handheld terminal, a smartphone, a tablet computer, a laptop, or any other type of portable computing device usable by an EIC in a work zone. The EIC device 104 has installed thereon one or more software applications for enabling the device 104 to communicate with a BOS 106 and/or the on-board control system 102. The EIC device 104 may also include one or more software applications for facilitating the input of work zone instructions. The EIC may input work zone instructions through one or more graphical user interfaces having selectable options, such as one or more drop-down menus, radio buttons, text input fields, push buttons, graphical menus, icons, and/or the like.

With continued reference to FIG. 1, the BOS 106 includes one or more servers located remotely from the EIC device 104 and the vehicle 100. The BOS 106 is in communication with the EIC device 104 and the on-board control system 102. Communication may occur between the EIC device 104 and the on-board control system 102 with or without involvement of the BOS 106. As the vehicle 100 approaches a work zone, the vehicle 100 may communicate a request for work zone instructions (not shown in FIG. 1) to the EIC device 104 and/or the BOS 106. In response to receiving the request, either directly from the on-board control system 102 or the BOS 106, the EIC device 104 may communicate one or more work zone instruction messages 108 to the on-board control system 102 or the BOS 106. The EIC may manually cause the transmission of the one or more work zone instruction messages 108 or, in other embodiments, the EIC device 104 may automatically communicate the one or more work zone instruction messages 108 in response to receiving the request. The EIC device 104 may communicate one or more work zone instructions 108 without receiving a request or waiting for a request. In such examples, the EIC device 104 may determine that a vehicle system is approaching via information made available from the BOS 106 or other alerts and/or messages and either prompt the EIC to communicate one or more work zone instruction messages 108 or automatically communicate the same.

Still referring to FIG. 1, the work zone instruction message(s) 108 may be received by the on-board control system 102 or, in other embodiments, the message(s) 108 may be received by the BOS 106 and converted to one or more transformed work zone instruction messages 110 which are then communicated to the on-board control system 102. The BOS 106 may convert a work zone instruction message 108 by determining a data format of the on-board control system 102 and converting the data within the message 108 to the data format that is readable or compatible with the on-board control system 102. For example, the BOS 106 may extract work zone instruction parameters from the message 108 and transform the parameters to a track data framework that is associated with the on-board control system 102 of the vehicle system.

With continued reference to FIG. 1, once the on-board control system 102 receives a work zone instruction message (either the original work zone instruction message 108 or a transformed work zone instruction message 110), it extracts work zone instruction parameters from the message and generates a visual diagram and/or textual instructions based on the extracted parameters. The visual diagram and/or textual instructions may be generated in any number of ways based on data available to the on-board control system 102 including, for example, PTC data, track data, and/or the like. The visual diagram may be any type of graphical data such as, but not limited to, a digital image file (e.g., a JPG, PNG, GIF, etc.), vector data, and/or other data representative of a visual diagram. The on-board control system 102 then communicates a visual diagram and/or textual instructions 112 to the EIC device 104, either directly or indirectly through the BOS 106. The visual diagram and/or textual instructions may also be transformed by the BOS 106, resulting in a transformed visual diagram and/or textual instructions 114. The visual diagram and/or textual instructions are then received by the EIC device 104, which may prompt the user (the EIC, for example) to approve or reject them through one or more graphical user interfaces.

The EIC may determine that the visual diagram and/or textual instructions do not match the intention of the EIC and/or the work zone instruction message for various reasons, such as a data entry error by the EIC, a communication error, a translation error, a configuration error in which the instruction message does not match the track framework used by the on-board system, a configuration error in which track data does not match, and/or other like errors that may occur within the system 1000. Further, in non-limiting embodiments, the EIC device 104 may include one or more software applications for automatically verifying the visual diagram and/or textual instructions by analyzing the visual diagram and/or parsing the textual instructions to identify parameters that can be compared to parameters associated with the inputted work zone instructions.

Still referring to FIG. 1, if the EIC approves of the visual diagram and/or textual instructions 112, the EIC then, through the EIC device 104, communicates an approval signal 116 to the on-board control system 102, either directly or indirectly through the BOS 106. In response to receiving the approval signal 116, the on-board control system may enforce the instructions from the work zone instruction message that are depicted in the visual diagram and explained by the textual instructions. Such enforcement may be automatic in response to receiving an approval signal 116 or may be initiated by the operator of the vehicle system. If the EIC rejects the visual diagram and/or textual instructions 112, a rejection signal may be communicated to the on-board control system 102. Instead of or in addition to sending a rejection signal, the EIC may communicate one or more new or updated work zone instruction messages to the on-board control system 102. In this manner, the process can be repeated until a visual diagram and/or textual instructions are approved and the instructions enforced by the on-board control system 102.

The work zone instruction message may include various fields representative of parameters that can be used by the on-board control system to control movement of the vehicle system within and approaching the limits of a designated work zone. For example, the work zone instruction parameters may specify work zone limits, work zone speed restrictions, work zone routing, and/or any other like information concerning operation of the vehicle system within a work zone. Moreover, a work zone instruction message may include multiple messages packaged together or communicated separately. In some non-limiting embodiments, a work zone instruction message includes a header for identifying the source and/or intended destination for a message. The work zone instruction message may also include freeform text inputted by the EIC. The work zone instruction message may include data arranged in any manner in one or more data structures of any type.

Figure 2A:
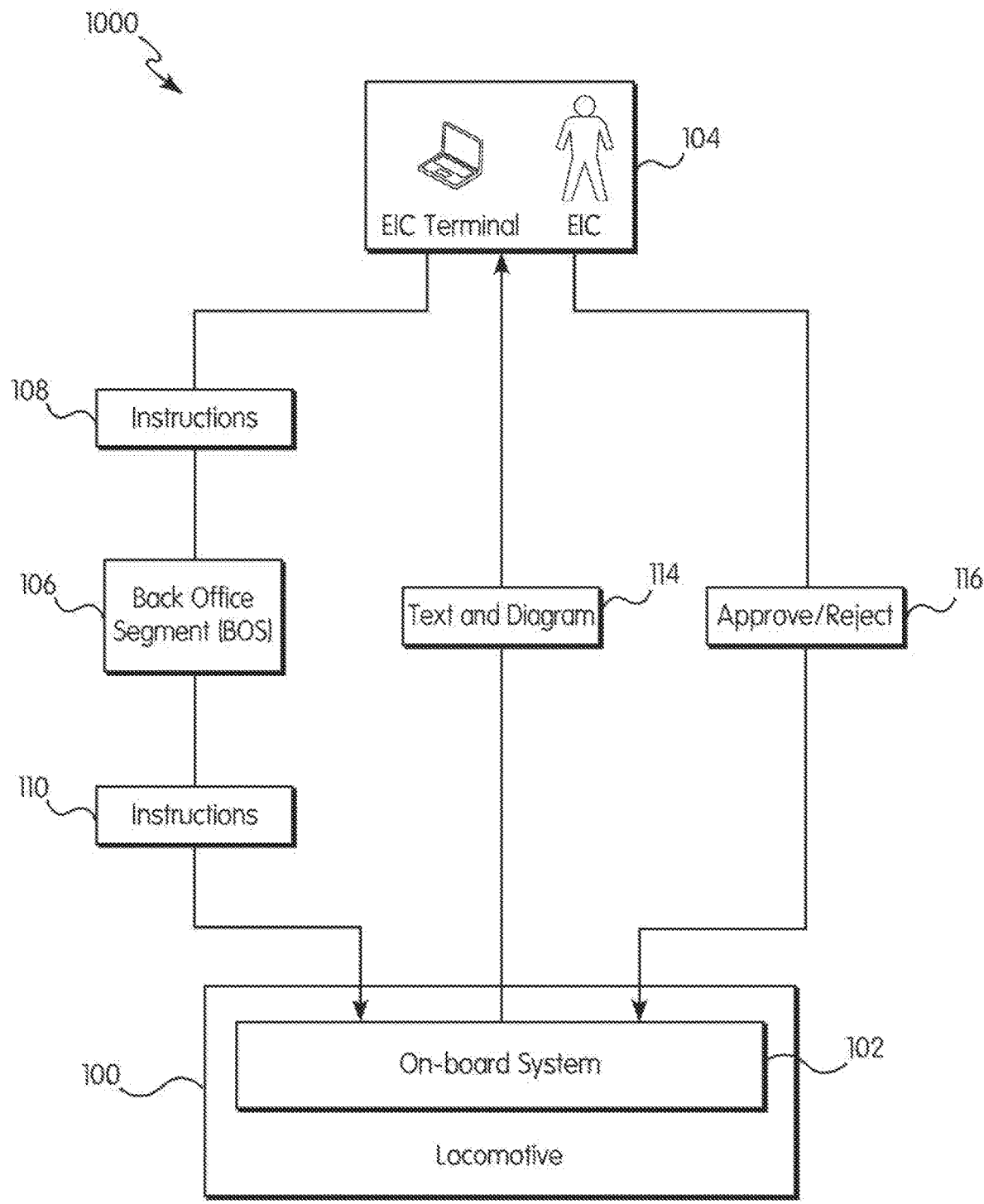
FIG. 2A is another schematic diagram of one example of a verification system for verifying work zone instructions.

Referring now to FIG. 2A, a schematic diagram of a system 1000 for verifying work zone instructions is shown. In the depicted example, the work zone instruction message 108 communicated by the EIC device 104 is first received by the BOS 106. The BOS 106 then transforms the work zone instruction message into a transformed work zone instruction message 110 that is communicated to and received by the on-board control system 102. In the example shown in FIG. 2A, the visual diagram and/or textual instructions are communicated from the on-board control system 102 to the EIC device 104 without involvement of the BOS 106. Likewise, the approval signal 116 is also communicated from the EIC device 104 to the on-board control system 102 without involvement of the BOS 106.

Figure 2B:
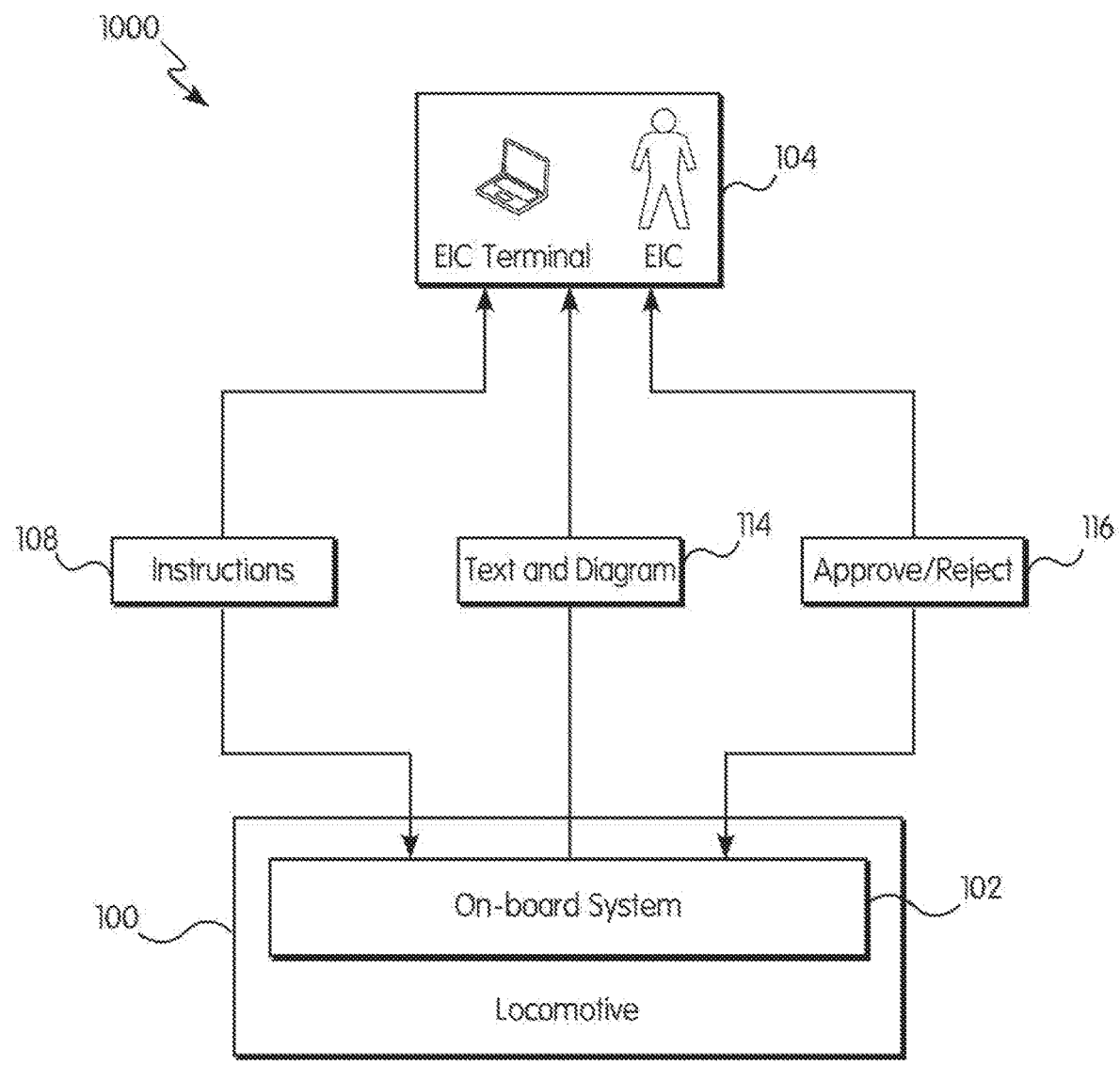
FIG. 2B is a further schematic diagram of one example of a verification system for verifying work zone instructions.

Referring now to FIG. 2B, a schematic diagram of a system 1000 for verifying work zone instructions is shown according to a further preferred and non-limiting embodiment. In this depicted example, the work zone instruction message 108 is communicated by the EIC device 104 to the on-board control system 102 without involvement of the BOS. Likewise, and as shown in the example of FIG. 2A, the visual diagram and/or textual instructions and the approval signal are also communicated without involvement of the BOS. It will be appreciated that any communication path may be used for one or more of the communications that occur between the EIC device 104 and the on-board control system 102.

Figure 3A:
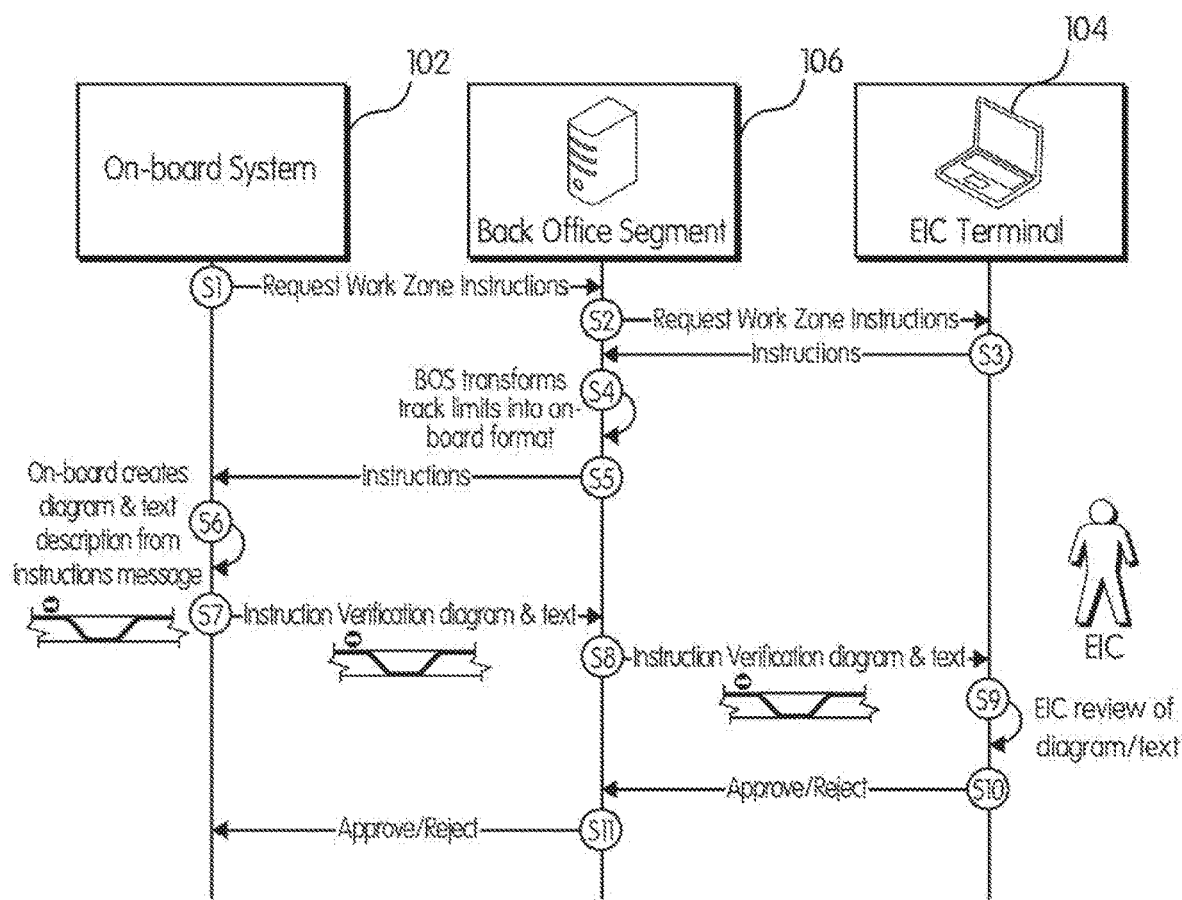
FIG. 3A is a sequence diagram of one example of a method for verifying work zone instructions.

FIG. 3A shows a sequence diagram for a system and method for verifying work zone instructions according to an example. In particular, FIG. 3A illustrates a sequence diagram in which communications between the EIC device 104 and the on-board control system 102 are routed through and/or modified by the BOS 106. At s1, a request for work zone instructions is communicated from the on-board system 102 to the BOS 106. At s2, the BOS communicates the request to the EIC device 104. At s3, the EIC device 104 returns the instructions to the BOS 106. At s4, the BOS 106 transforms the route limits into a format for the on-board control system 102 and, at s5, the BOS 106 communicates the transformed instructions to the on-board control system 102. At s6, the on-board control system 102 generates a visual diagram and/or a textual description from the transformed instructions. At s7, the visual diagram and/or textual description are communicated to the BOS 106. The BOS 106, at s8, communicates the visual diagram and/or textual description to the EIC device 104. At s9, the EIC device 104 accepts an approval or rejection of the visual diagram and/or textual description from an EIC. At s10, the approval or rejection is communicated to the BOS 106 which, at s11, communicates the approval or rejection to the on-board control system 102. It will be appreciated that additional or fewer operations may take place.

Figure 3B:
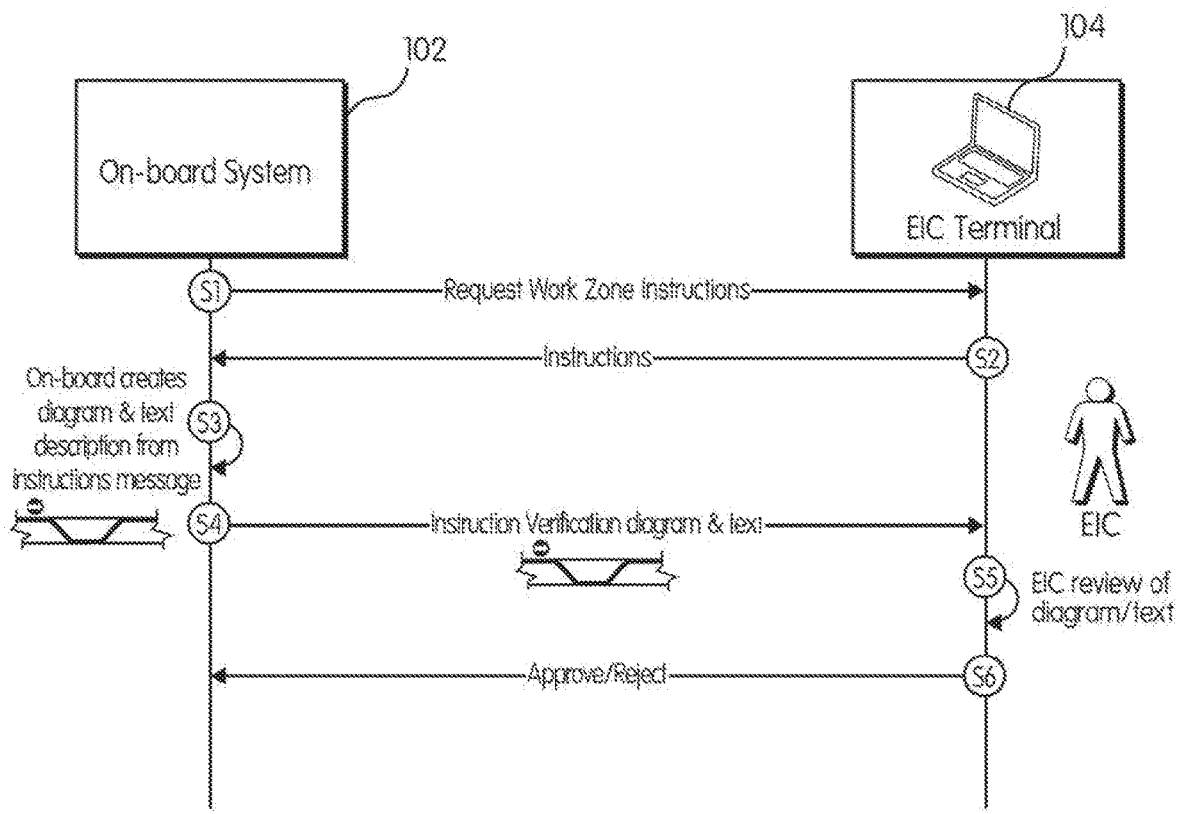
FIG. 3B is another sequence diagram of one example of a method for verifying work zone instructions.

FIG. 3B illustrates a sequence diagram according to an example in which communications between the EIC device 104 and the on-board control system 102 are not routed through or modified by the BOS 106. At s1, a request for work zone instructions is communicated from the on-board system 102 to the EIC device 104. At s2, the EIC device communicates work zone instructions to the on-board control system 102. At s3, the on-board control system 102 generates a visual diagram and/or a textual description from the instructions. At s4, the visual diagram and/or textual description are communicated to the EIC device 104. At s5, the EIC device 104 accepts an approval or rejection of the visual diagram and/or textual description from an EIC. At s6, the approval or rejection is communicated to the on-board control system 102. It will be appreciated that additional or fewer operations may take place.

Figure 4:
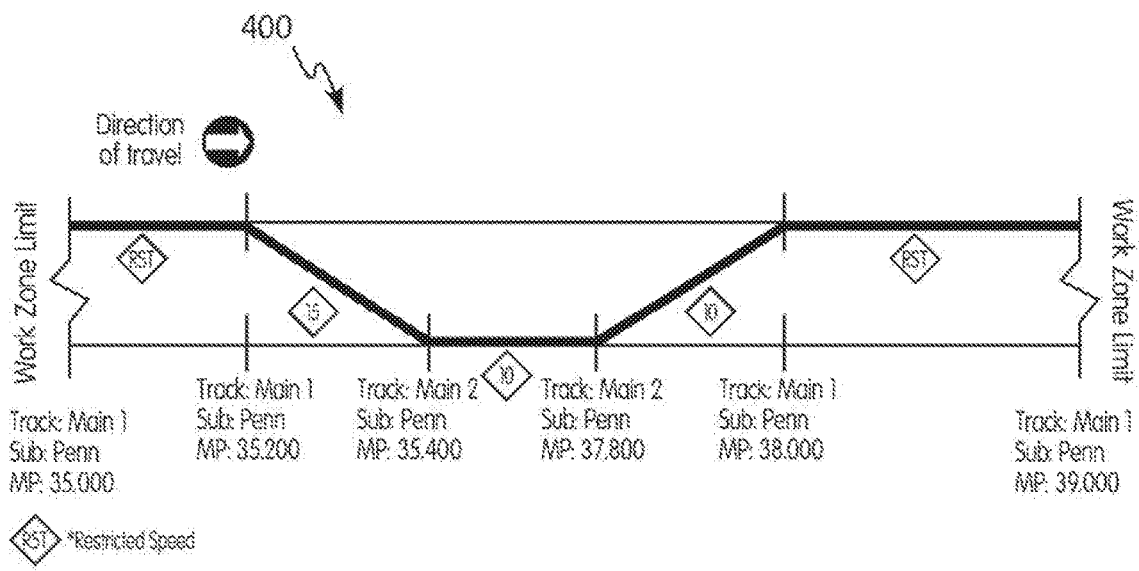
FIG. 4 is an example visual diagram.

FIG. 4 illustrates a visual diagram 400 according to one example. The visual diagram 400 may represent one or more parameters of the work zone instructions and/or other vehicle system data available to the on-board control system, such as work zone limits, direction of vehicle system travel, speed restrictions, track segments, and/or the like. In the non-limiting example shown in FIG. 4, the visual diagram 400 includes a visual representation of one or more tracks, milepost markers (e.g., "35.000," "35.200," "35.400," "37.800," "38.000," and "39.000"), speed restrictions (e.g., "RST," "15," "10"), direction of travel, and work zone limits. It will be appreciated that the visual diagram 400 may be represented in any number of ways. In some examples, the visual diagram 400 may be interactive such that information can be selectively displayed, expanded, enlarged, and/or the like.

Figure 5:
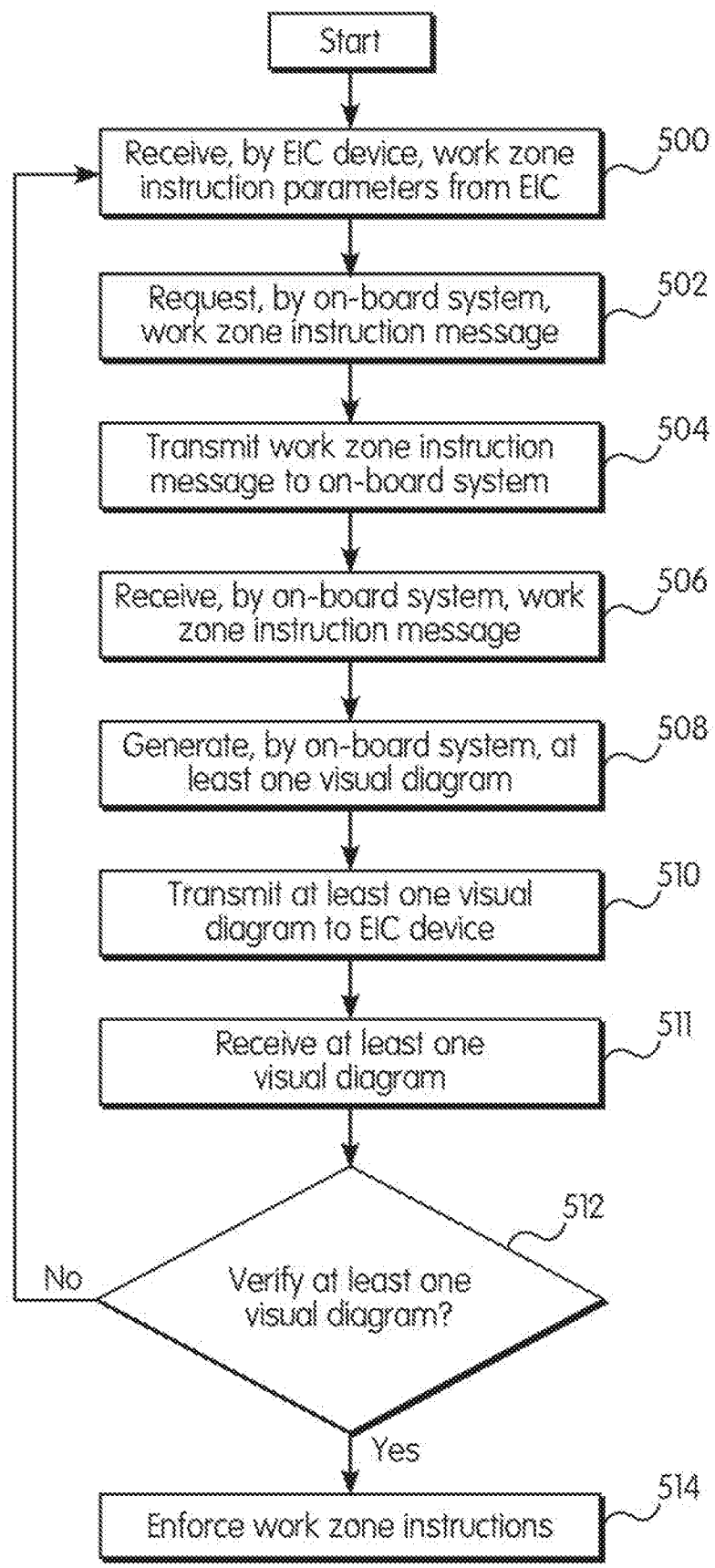
FIG. 5 is a flow diagram of one example of a method of verifying work zone instructions.

Referring now to FIG. 5, a flow diagram of one example of a method of verifying work zone instructions is shown. At 500, work zone instruction parameters are received by an EIC device. The work zone instruction parameters may be received via user input through one or more graphical user interfaces on the EIC device, may be received by the EIC device from a separate device or system, or may be received in any other manner. At 502, the on-board control system requests work zone instructions. As an example, the on-board control system may detect an upcoming work zone and, in response, communicate a request that is receivable by an EIC device or a BOS.

With continued reference to FIG. 5, a work zone instruction message is communicated to the on-board control system at 504. The work zone instruction message may be communicated in response to a request, at regular intervals, in response to detecting an approaching vehicle, or in another manner. Further, the work zone instruction message may be communicated to the on-board control system directly or, in other examples, may be communicated to a BOS where the work zone instruction message may be modified, translated, transformed, converted, and/or processed so as to be compatible and/or readable by the on-board control system. As an example, the BOS may transform the work zone instruction message based on a route framework associated with the on-board control system. At 506, the work zone instruction message is received by the on-board control system.

Still referring to FIG. 5, the on-board control system generates at least one visual diagram and/or textual instructions at 508 based at least partially on work zone instruction parameters from the work zone instruction message. Then, at 510, the at least one visual diagram is communicated to the EIC device from the on-board control system. In some examples, the at least one visual diagram may be communicated to a BOS and then to the EIC device. Once the EIC device receives the at least one visual diagram at 511, it may prompt the EIC to approve or reject the same at 512. If the at least one visual diagram is approved, the method may proceed to 514 in which the work zone instructions are enforced by the on-board control system. If the at least one visual diagram is rejected at 512, the method may proceed back to 500 where the EIC inputs work zone instruction parameters again or modifies the parameters and/or other aspects of the work zone instruction message. The method then repeats until at least one diagram generated by the on-board control system is approved and the work zone instructions are enforced.

Although the inventive subject matter has been described in detail for the purpose of illustration. It is to be understood that such detail is solely for that purpose and that the inventive subject matter is not limited to the disclosed embodiments, but, on the contrary, is intended to cover modifications and equivalent arrangements that are within the spirit and scope of the appended claims. For example, it is to be understood that the inventive subject matter contemplates that, to the extent possible, one or more features of any embodiment can be combined with one or more features of any other embodiment.

What is claimed is:

1. A method comprising:
   receiving, by an on-board system of a vehicle system, at least one electronic work zone instruction message from an employee-in-charge device located in a work zone;
   generating, by the on-board system of the vehicle system, at least one visual instruction diagram based at least partially on the electronic work zone instruction message;
   communicating the at least one visual instruction diagram from the on-board system of the vehicle system to the employee-in-charge device located in the work zone;
   receiving, by the on-board system of the vehicle system, a verification of the at least one visual instruction diagram or at least one new electronic work zone instruction message from the employee-in-charge device located in the work zone; and
   in response to receiving the verification or the at least one new electronic work zone instruction message: (i) enforcing at least one work zone instruction parameter of the electronic work zone instruction message by the on-board system of the vehicle system responsive to the verification being received; or (ii) generating, by the on-board system of the vehicle system, at least one new visual instruction diagram based at least partially on the at least one new electronic work zone instruction message responsive to a rejection being received,
   wherein the at least one new electronic work zone instruction message is received, the method further comprising:
   communicating the new visual instruction diagram from the on-board system of the vehicle system to the employee-in-charge device located in the work zone;
   receiving, by the on-board system of the vehicle system, a verification of the new visual instruction diagram or at least one new electronic work zone instruction message from the employee-in-charge device located in the work zone; and
   in response to receiving the verification or the at least one further electronic work zone instruction message: (i) enforcing the at least one new electronic work zone instruction message by the on-board system of the vehicle system responsive to the verification being received; or (ii) generating, by the on-board system of the vehicle system, a new visual instruction diagram based at least partially on the at least one new electronic work zone instruction message.

2. The method of claim 1, further comprising repeating receiving the at least one electronic work zone instruction message, generating the at least one visual instruction diagram, and communicating the at least one visual instruction diagram until the at least one electronic work zone instruction message is enforced by the on-board system of the vehicle system.

3. The method of claim 1, wherein the at least one visual instruction diagram comprises at least one route diagram and a textual instruction.

4. The method of claim 1, wherein generating the at least one visual instruction diagram comprises:
   extracting work zone instruction parameters from the electronic work zone instruction message; and
   converting the work zone instruction parameters to the visual instruction diagram.

5. The method of claim 1, wherein the at least one electronic work zone instruction message is received from a back office system, and wherein the at least one electronic work zone instruction message is received from the employee-in-charge device located in the work zone.

6. The method of claim 5, further comprising:
   responsive to receiving the at least one electronic work zone instruction message, extracting work zone instruction parameters from the electronic work zone instruction message; and
   transforming the work zone instruction parameters to a route data framework associated with the on-board system of the vehicle system.

7. The method of claim 1, wherein the at least one electronic work zone instruction message comprises at least one of a work zone limit, a work zone speed restriction, or a work zone route.

8. The method of claim 1, wherein communicating the at least one visual instruction diagram comprises communicating the at least one visual instruction diagram from the on-board system to a back office system, and communicating the at least one visual instruction diagram from the back office system to the employee-in-charge device located in the work zone.

9. The method of claim 1, wherein the employee-in-charge device comprises a handheld or portable computer located in the work zone.

10. The method of claim 1, further comprising:
requesting the at least one electronic work zone instruction message from the employee-in-charge device located in the work zone, wherein the at least one electronic work zone instruction message is communicated by the employee-in-charge device located in the work zone in response to the request.

\* \* \* \* \*